United States Patent

[11] 3,608,871

| [72] | Inventors | Jozsef Harsanyi<br>Budapest;<br>Geza Pinter, Budapest; Zoltan Pais, Ajka;<br>Zoltan Toth, Ajka, all of Hungary |
|---|---|---|
| [21] | Appl. No. | 875,097 |
| [22] | Filed | Nov. 10, 1969 |
| [45] | Patented | Sept. 28, 1971 |
| [73] | Assignees | Aluterv Aluminiumipari Tervezo Vallalat<br>Budapest,;<br>Ajkai Timfoldgyar es Aluminiumkoho<br>Ajka, Hungary |
| [32] | Priority | Nov. 29, 1968 |
| [33] | | Hungary |
| [31] | | AU-205 |

[54] LEVEL-REGULATING APPARATUS FOR TANKS CONNECTED IN SERIES
6 Claims, 4 Drawing Figs.

[52] U.S. Cl. .................................................. 259/95,
259/4, 259/18, 259/36, 259/48, 137/563, 137/566, 137/571, 137/590
[51] Int. Cl. ...................................................... B01f 5/12
[50] Field of Search ........................................... 259/4, 23, 60, 95, 96, 115, 18, 36, 2, 48, 63, 66; 137/563, 566, 571, 590

[56] References Cited
UNITED STATES PATENTS

| 683,327 | 9/1901 | Prinz .......................... | 259/4 |
| 2,884,231 | 4/1959 | Pyle et al. ..................... | 259/95 X |
| 3,307,834 | 3/1967 | Wilde .......................... | 259/23 X |

FOREIGN PATENTS

| 587,936 | 1/1959 | Italy ........................... | 259/60 |

*Primary Examiner*—Jordan Franklin
*Assistant Examiner*—George V. Larkin
*Attorney*—Young & Thompson ABSTRACT: Continuous flow apparatus for maintaining solid particles suspended in liquid for a predetermined period of time, as in alumina production. The suspension passes through a plurality of tanks, in series, and is agitated by flowing upwardly through a vertical stirring tube. The suspension that flows out of the upper end of the stirring tube is directed toward the next tank by a channel that has a drain for returning a portion of the lifted material to the tank from which it was lifted. Preferably, the drain is a conduit that extends downwardly from the channel, and the height of the channel within the tank is less than the height of the channel between tanks.

PATENTED SEP 28 1971 3,608,871

LEVEL-REGULATING APPARATUS FOR TANKS CONNECTED IN SERIES

The present invention relates to level-regulating apparatus for tanks connected in series, more particularly of the type in which a stirring tube raises a suspension of solid particles in a liquid and returns at least a portion of the suspension to the tank, to avoid settling during a process such as the production of alumina by continuous precipitation. The present invention will be illustrated in connection with apparatus for the production of alumina, but of course is applicable to all process in which suspensions of solids and liquids are to be maintained in a series of tanks so that the total dwell time of the suspension in the series of tanks will be suitable for the occurrence of the physical action or chemical reaction in question. Thus, in the illustrated example, for the production of alumina in the form of aluminum hydroxide or so-called hydrate, in the form of a suspension of crystals, the so-called aluminate liquor, to which the so-called seed hydrate was previously added, is maintained in agitation in the tanks for a period of, say, 50 to 100 hours.

It is of course to be understood that such operations are carried out continuously, with substantially continuous feed to the first tank and substantially continuous flow between tanks and substantially continuous withdrawal from the last tank of the series, with the feed and withdrawal rates regulated according to the tank volume so as to achieve the desired liquid levels and total dwell time.

In this equipment, stirring is effected by a vertical tube whose lower or inlet end is disposed near the bottom of the tank and whose upper end is above the liquid level in the tank. Upward flow of suspension through the tube can be achieved either by means of a vapor lift or a positive impeller, which latter can be of the piston or rotary blade type.

In the past, it has been proposed to transfer suspension from tank to tank by means of a simple overflow; but this has the drawback that not enough solids reach the next tank. It is possible to counteract this tendency by providing regulators and additional equipment and possibly also by a manually operated sluice; but such solutions are complicated, expensive and require additional labor. Also, the flow conditions from tank to tank are not uniform and optimum conditions in the tank cannot be maintained, so that production suffers and costs rise.

Accordingly, it is an object of the present invention to provide level-regulating apparatus for tanks connected in series, in which optimum flow rates and solids concentrations in the flow from tank to tank can be easily maintained.

Another object of the present invention is the provision of such apparatus, in which the accumulation of froth in a given tank will be avoided.

Still another object of the present invention is the provision of such apparatus, which will avoid product degradation, and will not need additional power equipment, nor additional supervision.

Finally, it is an object of the present invention to provide such apparatus, which will be relatively simple and inexpensive to manufacture, install, operate, maintain and repair, and rugged and durable in use.

Briefly, the objects of the present invention are achieved by providing in at least one of the series of such tanks having a vertical stirring tube, a channel for receiving and conveying to the next tank the overflow from the stirring tube, while at the same time providing a drain from the channel back into the tank in question so that a portion of the overflowing suspension will be recycled. In a preferred embodiment, the height of the channel within the tank is lower than the height of the channel between the tanks, so as to promote the flow of foam through the channel and into the next tank. The drain is preferably in the form of a downwardly extending conduit.

Other objects, features and advantages of the present invention will become apparent from a consideration of the following description, taken in connection with the accompanying drawing, in which.

Figure 1:
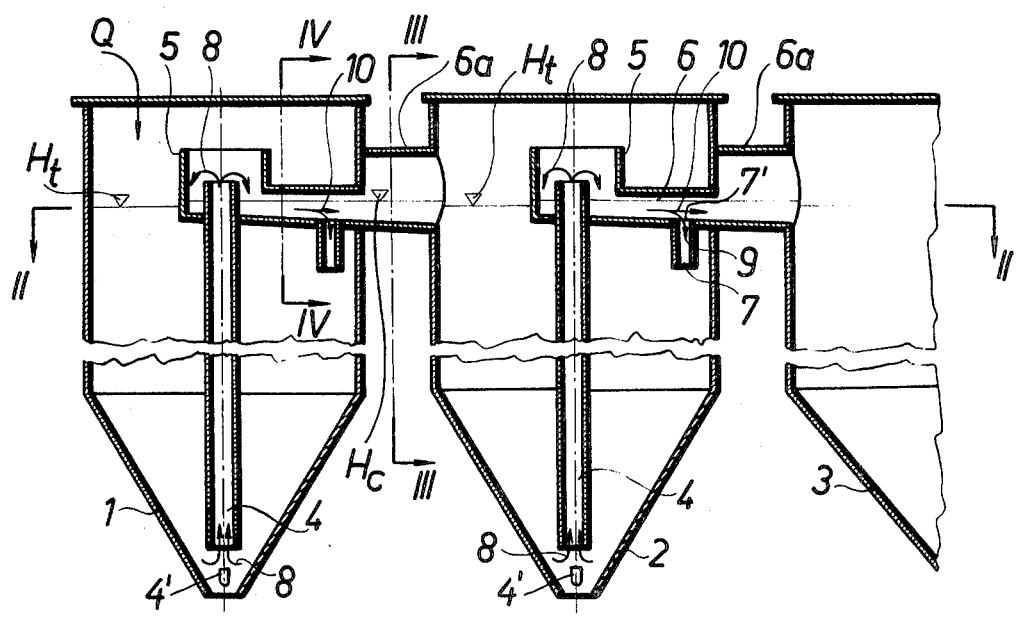
FIG. 1 is a somewhat diagrammatic side cross-sectional view of apparatus according to the present invention embodied in a series of tanks.
Figure 2:
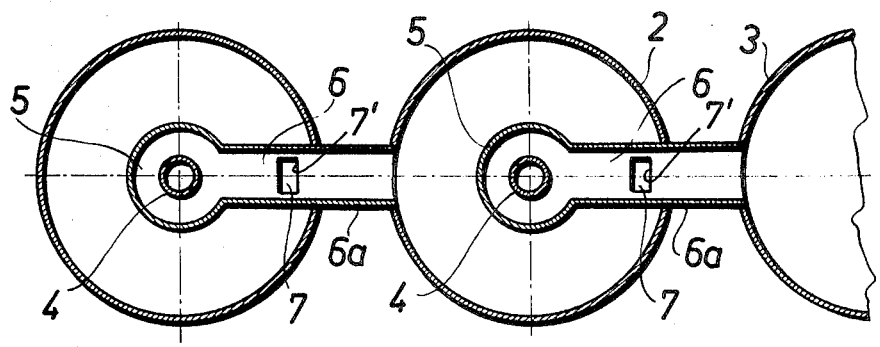
FIG. 2 is a schematic cross-sectional view taken on the line II—II of FIG. 1.
Figure 3:
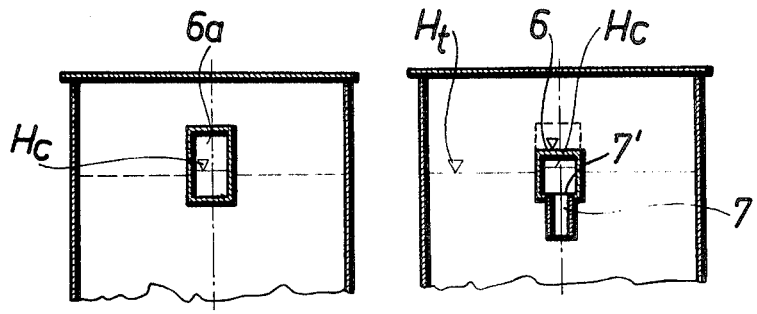
FIG. 3 is a fragmentary schematic cross-sectional view taken on the line III—III of FIG. 1.
Figure 4:
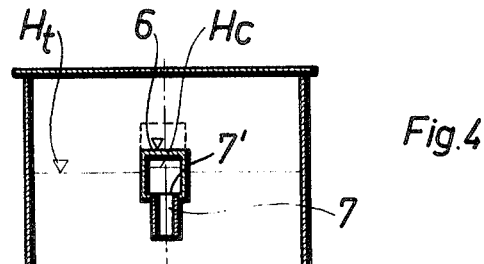
FIG. 4 is a view similar to FIG. 3 but taken on the line IV—IV of FIG. 1.

Referring now to the drawing in greater detail, there are shown three tanks, 1, 2 and 3, in series, with the feed of the suspension to tank 1 shown schematically by the arrow Q. The liquid level of the suspension in the various tanks is shown at $H_t$. Each tank is equipped with a vertical centrally disposed stirring tube 4, open at top and bottom, with its lower end disposed adjacent the bottom of the tank and its upper end disposed above the level $H_t$. The vapor lift 4' or positive pump for impelling suspension upwardly in tube 4 is conventional. An overflow-collecting vessel 5, upwardly open and downwardly closed, surrounds the upper end of tube 4 and communicates laterally with a material-conveying channel 6 which leads out of one tank and extends between two tanks and empties into the next tank. Channel 6 is closed at its top and is of a height within the tank less than the height of the portion 6a of the channel 6 which is between the tanks.

A drain conduit 7 opens from and extends downwardly from a drain opening 7' in the bottom of channel 6 within the tank. The level of the suspension within channel 6 is shown at $H_c$, and it will be appreciated that channel 6 and vessel 5 are partially immersed in the suspension in the tank, and that conduit 7 is totally immersed.

In operation, suspension in the tank flows upwardly through conduit 4 and out from the top of the conduit in the direction of the arrows 8, and is caught in the collecting vessel 5, from which it flows along channel 6 to the next tank. More or less of the suspension flowing through channel 6 will be returned to the tank from which it was lifted, through the drain conduit 7, to an extent depending in part on whether the level $H_t$ is higher or lower than the level $H_c$. If $H_c$ is lower than $H_t$, then relatively more suspension flows in the direction of the arrow 10 to the next tank, as compared to the recycle in the direction of the arrow 9. But if $H_c$ is higher than $H_t$, then relatively more will flow in the direction of arrow 9 as recycle, as compared to the through flow to the next tank in the direction of arrow 10. Thus, $H_c$ tends to reach an optimum level and the recycle automatically works to this end.

Of course, the above discussion omits the fact that the suspension is not in practice homogeneous but rather is denser adjacent the bottom of the tank than adjacent the level $H_t$, so that what is lifted in conduit 4 (apart from the vapor in the case of a vapor lift) will be denser than the adjacent suspension on the outside of collecting vessel 5. Also, the hydrodynamic effects of flow through channel 6 and conduit 7 are not mentioned in the above discussion. These factors, however, do not change the overall operation as discussed above.

The channel 6 is downwardly inclined to promote flow therethrough, at an angle less than 15° and preferably 1° to 2°.

Finally, it has been found that reduction of the height of channel 6 within the tank relative to the height of channel portions 6a outside the tank promotes the flow of scum from vessel 5 through channel 6 and into the next tank for eventual discharge.

From a consideration of the foregoing disclosure, therefore, it will be evident that all of the initially recited objects of the present invention have been achieved.

Although the present invention has been described and illustrated in connection with a preferred embodiment, it is to be understood that modifications and variations may be resorted to without departing from the spirit of the invention, as those skilled in this art will readily understand. Such modifications and variations are considered to be within the purview and scope of the present invention as defined by the appended claims.

Having described our invention, we claim:

1. In liquid level-regulating apparatus, a plurality of tanks connected in series, each tank having a vertically disposed stirring tube and means for promoting the vertical flow of a suspension of solids and liquid upwardly through the stirring tube and out through the top of the stirring tube, and including means for conveying suspension from one tank to the next tank in the series of tanks; the improvement in which said conveying means comprises a channel for receiving suspension from the top of the stirring tube and conveying said received suspension to the next tank in the series, the channel having a drain opening for returning a portion of the suspension to the tank from which it was raised.

2. Apparatus as claimed in claim 1, and a drain conduit extending downwardly from said drain opening inside the tank.

3. Apparatus as claimed in claim 1, and a collecting vessel at the top of the stirring tube for receiving suspension discharged from the upper end of the stirring tube.

4. Apparatus as claimed in claim 1, the channel being downwardly inclined from the horizontal in the direction of the next tank at an angle less than 15°.

5. Apparatus as claimed in claim 4, said angle being 1° to 2°.

6. Apparatus as claimed in claim 1, said channel having a closed top within the tank and a portion between tanks that also has a closed top, the height of the channel within the tank being substantially less than the height of the channel portion between the tanks.